Feb. 16, 1960        R. S. ZEBARTH        2,924,846

MACHINE FOR REMOVING THE HEADS OF DRESSED POULTRY

Filed Oct. 22, 1956             2 Sheets-Sheet 1

INVENTOR.
Ralph S. Zebarth

BY

ATTORNEY

Feb. 16, 1960 R. S. ZEBARTH 2,924,846
MACHINE FOR REMOVING THE HEADS OF DRESSED POULTRY
Filed Oct. 22, 1956 2 Sheets-Sheet 2
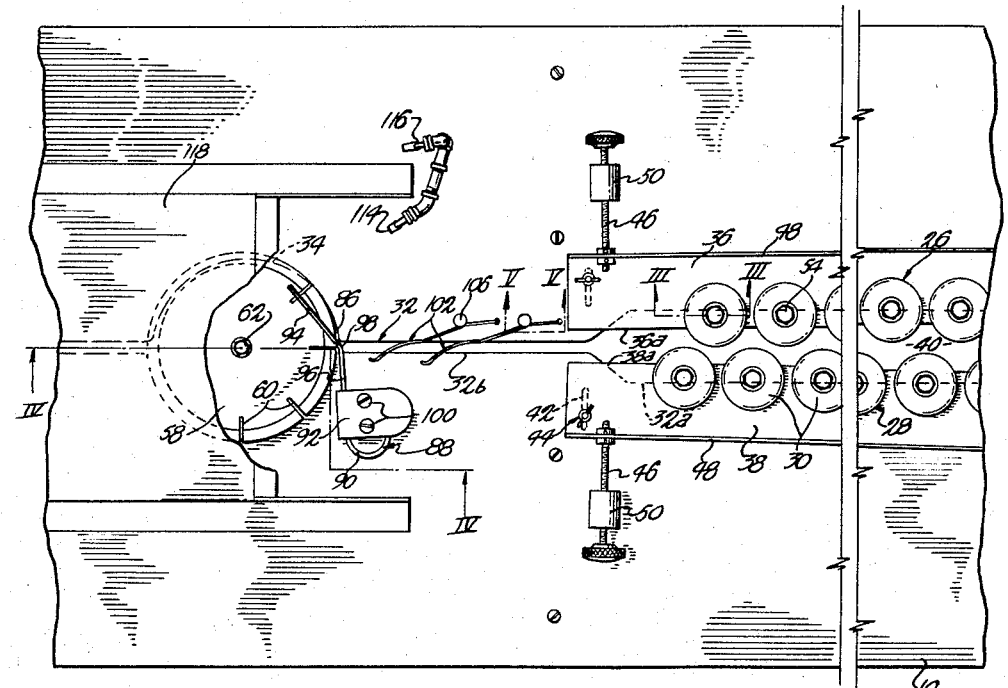
Fig. 2.
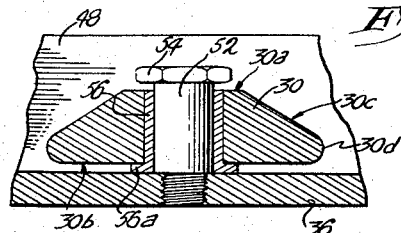
Fig. 3.
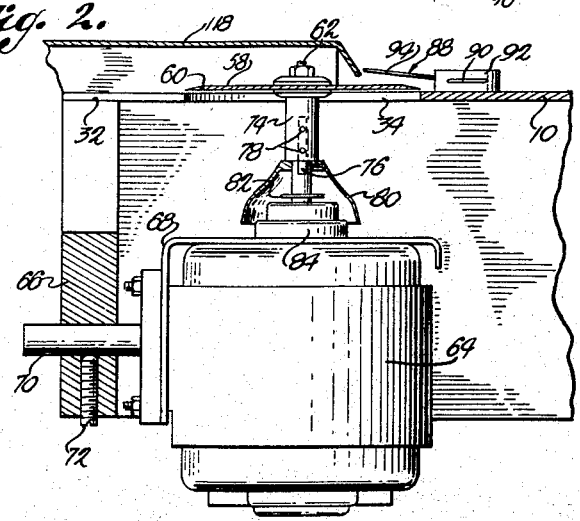
Fig. 4.
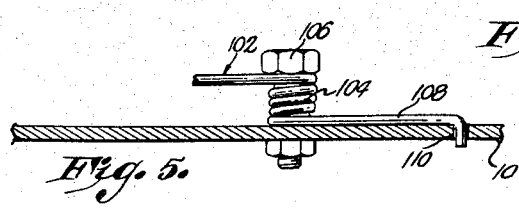
Fig. 5.
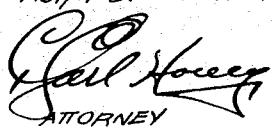
INVENTOR.
Ralph S. Zebarth
BY
ATTORNEY United States Patent Office 2,924,846
Patented Feb. 16, 1960

2,924,846

MACHINE FOR REMOVING THE HEADS
OF DRESSED POULTRY

Ralph S. Zebarth, Hickman Mills, Mo., assignor, by mesne assignments, to Gordon Johnson Company, Kansas City, Mo., a corporation of Missouri Application October 22, 1956, Serial No. 617,518

8 Claims. (Cl. 17—12)

This invention relates to poultry processing equipment and particularly to structure for automatically disjointing and severing the head of a bird from its neck in close proximity to the skull while the bird is advanced by a conveyor and suspended therefrom by its legs.

It is the most important object of the instant invention to provide an arrangement of parts which is positively effective in properly disjointing the necks adjacent the head of the bird and in severing the same close to the skull while the neck is held longitudinally taut to the end that a minimum amount of neck skin and other tissue are permitted to pass to waste with the head.

Another important object of the present invention is the provision of an improved disjointing assembly for the aforementioned purposes having opposed sets of neck-receiving rollers which are individually mounted for free floating movement along the axis of rotation thereof to the end that disjointing is positively effected as the birds are advanced and the necks thereof held taut between the conveyor and the said rollers.

A further object of the present invention is to provide in the disjointing feature of the instant invention, means for positively and minutely adjusting the distances between the rollers in accordance with the dimensions of the necks of the birds being processed.

A still further object of the instant invention is to provide improved severing structure that includes a special passage between the peripheries of a cutter disc and a hole into which the necks are guided by a novel deflector, all for the purpose of severance in the manner and adjacent the skull as above set forth.

Other objects include the provision of means for lubricating the entire assembly to enhance free movement of the birds thereto and removal of foreign matter; the provision of means for protecting the electric motor which drives the said cutter disc; and many important details of construction to be made clear as the following specification progresses.

In the drawings:

Fig. 2 is an enlarged, fragmentary, plan view of the supporting table and associated parts.

Fig. 3 is a fragmentary, detailed, cross-sectional view still further enlarged and taken on line III—III of Fig. 2.

Fig. 4 is a fragmentary, cross-sectional view still further enlarged taken substantially on irregular line IV—IV of Fig. 2.

Fig. 5 is a fragmentary, detailed, enlarged, cross-sectional view taken on line V—V of Fig. 2.

Figures 1, 6:
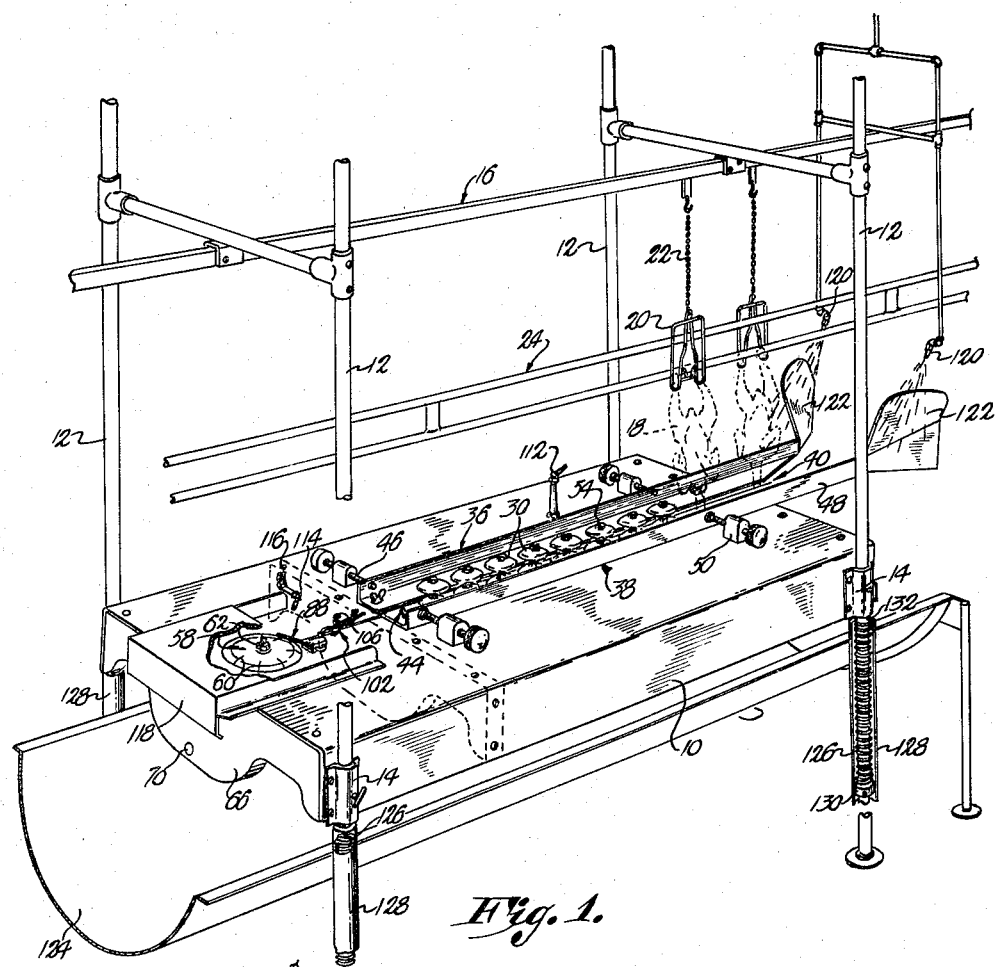
Figure 1 is a perspective view of a machine for removing the heads of dressed poultry made pursuant to the present invention certain parts being broken away to reveal details of construction.
Fig. 6 is a fragmentary, perspective view illustrating the position of the birds as the same emanate from the disjointer and approach the severing means.

A primary support for all of the components of the instant invention advantageously takes the form of an elongated, horizontal table 10 that may be supported for vertical adjustment by a plurality of legs 12 through the medium of tubular set collars 14 on the support 10.

When the equipment is placed in use, table 10 is disposed horizontally beneath an overhead conveyor 16 along which birds 18 are advanced through a horizontal, rectilinear path of travel. As seen in Figs. 1 and 6, the birds 18 are suspended by their legs through use of shackles 20 hanging from the conveyor 16 by chains or other flexible elements 22. The shackles are preferably guided as in the manner seen in Figs. 1 and 6 by a horizontal track 24 along which shackles 20 slide and through use of mechanism not herein disclosed; the said shackles 20 are guided alternately along opposite vertical faces of the guide 24.

Two spaced-apart rows 26 and 28 of spaced rollers 30 are carried by the support 10 in partial overlapping relationship to a longitudinal opening 32 formed in the support 10. It is to be noted that the opening 32 is provided with a relatively wide length 32a adjacent the rollers 30, and a substantially narrower length 32b, the latter of which terminates in a preferably circular hole 34. The rows 26 and 28 of rollers 30 are in turn supported by elongated plates 36 and 38 respectively having longitudinal edges 36a and 38a disposed to present a space 40 therebetween.

A slot 42 at each end respectively of each plate 36—38 and formed in the latter or in the support 10 as desired, receives bolt and wing nut means 44 for holding the plates 36 and 38 against movement with respect to the support 10. Upon loosening of the fastenings 44, the plates 36 and 38 may be adjusted toward and away from each other through the medium of a plurality of screws 46 rotatably attached to upstanding flanges 48 on the plates 36 and 38 and threaded in an internally threaded boss 50 carried by the support 10.

The plates 36 and 38 are adjusted so that the width of the space 40 between the edges 36a and 38a thereof progressively decreases as the length 32b of the opening 32 is approached. Manifestly, therefore, the space between the rows 26 and 28 of rollers 30 likewise progressively decreases as the opening length 32b is approached.

Accordingly, through use of the adjusting means 46, the relative angularity, as well as the distance between the rows 26 and 28, may be varied depending upon the size of the birds 18 being handled by the apparatus. In any event, the distance between the rows 26 and 28 should be less than the diameter of the heads of the birds 18 and be in such close proximity, particularly at the innermost ends of the rows 26 and 28 to permit passage of the necks 18a of the birds 18 without undue drag. In any event, it is to be preferred that the said necks 18a be squeezed rather tightly as the same pass between the two innermost rollers 30. When the rows 26 and 28 are properly adjusted, the heads of the birds 18 should be cleared easily by the space 40 and by the length 32a of opening 32 as such heads advance along the rollers 30 therebeneath.

Each of the rollers 30 is mounted for horizontal rotation about the vertical axes of upstanding pins 52 secured to the uppermost faces of the plates 36 and 38. Heads 54 on the upper ends of pins 52 limit the extent of upward movement of the rollers 30, it being noted in Fig. 3 of the drawings that the rollers 30 are floatingly mounted on the pins 52 for limited vertical reciprocation along their axes of rotation about the pins 52.

Each roller 30 is preferably provided with flat, uppermost and lowermost faces 30a and 30b respectively and are otherwise substantially frusto-conical presenting inclined faces 30c that slope downwardly and outwardly toward a transversely arcuate peripheral edge 30d that merges with the flat face 30b. A tubular brushing 56 pressed tightly within the roller 30 is provided with an integral outturned flange 56a at the lowermost end thereof which is disposed between the corresponding plate 36—38 and the surface 30b.

The width of the length 32b of opening 32 is sufficient to clear the necks 18a of the birds 18, but narrower than the diameter of the heads of the birds to the end that such heads slide along the support 10 therebeneath as the necks 18a progress along the opening length 32b toward hole 34.

A cutter disc 58 provided with a plurality of radial slits 60 is supported adjacent the hole 34 in slightly spaced relationship to the upper face of the support 10 thereabove by drive shaft 62 of an electric motor 64, which is in turn supported by a framepiece 66 of support 10 through the medium of a bracket 68. The shaft 62 is adjusted to a vertical position and its proper eccentricity to the hole 34 is pre-selected by virtue of the fact that the bracket 68 has a lateral circular rod 70 extending therefrom through the framepiece 66. Screw 72 in the framepiece 66 bears against the stem 70 as seen in Fig. 4.

A tubular arbor 74 is vertically adjustable on the shaft 62 to vary the distance between the disc 58 and the support 10 by virtue of a longitudinal slot 76 in the shaft 62 receiving setscrews 78 in the arbor 74.

The motor 64 is preferably sealed against entrance of moisture thereinto by a suitable coating thereon and protected additionally through the medium of a spinner assembly including a hood 80 and a disc 82 secured to the shaft 62 for rotation therewith. The open bottom hood 80 surrounds hub 84 of motor 64 and encloses the disc 82 as seen in Fig. 4.

The eccentric arrangement of the shaft 62 and the disc 58 with respect to the hole 34, presents a passage 86 between the peripheries of the disc 58 and the hole 34 for receiving the necks 18a and which progressively increases in width as the length 32b of opening 32 is approached (see Fig. 2).

A deflector broadly designated by the numeral 88 is provided for guiding the necks 18a into the passage 86 and includes a rod 90 carried by a block 92 which is in turn attached to the support 10. The rod 90 is provided with a pair of angularly displaced stretches 94 and 96 spaced above the upper surface of support 10, it being noted in Fig. 4 that the distance between the stretch 94 and the support 10 progressively increases as the outermost terminal end of the stretch 94 is approached. While the stretch 96 is substantially perpendicular to the longitudinal axis of the opening 32, stretch 94 extends into overlying relationship to the disc 58 tangentially to the latter and in substantially the same direction as the passage 86. The stretch 94 and the passage 86 converge however, as the opening 32 is approached and the zone of merger 98 between the stretches 94 and 96 is substantially in alignment with the longitudinal axis of the opening 32.

The deflector 88 is clamped in the above described position by the block 92 but may be adjusted upon loosening of fasteners 100.

A plurality of spring wire retainers 102 extend across the opening 32 between the plates 36—38 and the hole 34. Each retainer 102 is provided with an intermediate coil 104 surrounding a fastener 106 carried by the support 10. One leg 108 of each retainer 102 extends through a port 110 in the support 10 as seen in Fig. 5.

A spraying assembly includes a nozzle 112 carried by the support 10 for directing a plurality of streams of water along all of the rollers 30, a nozzle 114 disposed to direct a spray against the disc 58 particularly at the zone of severance and deflection into the passage 86, a nozzle 116 disposed to direct a stream against the upper surface of a hood 118 carried by the support 10 and partially overlapping the disc 58, and a pair of nozzles 120 disposed to spray against wings 122 forming an integral part of the plates 36 and 38 and disposed to present a flared entrance throat for the birds 18 as the same are advanced to the apparatus by the conveyor 16.

The water, all foreign matter and the severed heads of the birds are collected by a trough 124 underlying the support 10 for flushing such material to a point of disposal.

As the birds 18 are advanced along the rollers 30 which are offset in staggered relationship as seen in Fig. 2, the necks and heads are retarded, causing the birds 18, the shackles 20 and the connections 22 to assume the position shown in Fig. 6 by virtue of the fact that the rollers 30 retard the head, causing the necks 18a to be held longitudinally taut. As the necks 18a pass successively between the rollers 30, the necks are disjointed adjacent the skull and such result is enhanced by virtue of the free vertical reciprocation of the rollers 30 on their pins 52. Foreign matter collecting along the plates 36 and 38 and on the rollers 30, will not retard free rotation of the rollers 30 because of the space provided between the faces 30b and the support 10 by flanges 56a. Furthermore, the streams of water emanating from nozzle 112 constantly flush away all such foreign matter and keep the rollers 30 lubricated for free sliding movement of the necks 18a through the disjointing assembly.

As the necks 18a advance to the spring retarders 102, they must be pulled through the slot length 32b by the conveyor 16. While the springs 102 yield to the pulling action permitting passage of the necks 18a to the cutter disc 58, nevertheless the retarding effect thereof maintains the necks 18a stretched longitudinally as indicated in Fig. 6. The retarders 102 also effectively feed the necks 18a to the disc 58 singly and assure clearance of the severed necks before the next succeeding neck is released to the disc 58 by the retarders 102.

As soon as the necks 18a move into engagement with the zone of juncture 98 between stretches 94 and 96 of the deflector 88, they are guided laterally by the stretch 94 into the passage 86. Since the necks 18a are still longitudinally taut, severance within the passage 86 occurs in close proximity to the skull leaving no neck skin or other tissue on the skull for passage to waste along the trough 124 with the heads. As the necks pass beyond the terminal end of the stretch 94 they slide along the upper surface of hood 118 which is kept lubricated and clean by the spray emanating from the nozzle 116.

Water emanating from the nozzle 114 and other foreign matter washed away thereby, is kept from passage to the motor 64 by the spinning hood 80. Any additional water that may pass to the interior of the hood 80 is likewise spun away by the rotating disc 82.

Proper adjustment of the disc 58 with respect to the upper surface of support 10 and with respect to the hole 34 to present passage 86, is effected as above set forth by loosening setscrews 72. Similarly, proper adjustment of the deflector 88 may take place upon loosening of fasteners 100.

Support 10 rests upon springs 126 coiled about legs 12 and confined by sleeves 128. Set collars 130 attached to the legs 12 receive the lowermost ends of the springs 126.

Upon loosening of the set collars 14, an operator can easily and quickly adjust the height of the support 10 since the same is yieldably biased upwardly when set collars 130 are properly adjusted.

Sleeves 128 are provided with inturned flanges 132 resting on the upper ends of springs 126.

Having thus described the invention what is claimed as new and desired to be secured by Letters Patent is:

1. In poultry processing equipment for disjointing the head of a bird from its neck adjacent the base of the skull while the neck is stretched longitudinally taut and as the bird is advanced along a horizontal, rectilinear path of travel, suspended from a conveyor by its legs, the combination of: a support adapted to be positioned beneath the conveyor; two spaced, horizontal rows of spaced, horizontally-rotatable rollers disposed with the space therebetween in alignment with the path of travel of said neck, said rows of rollers being adapted to receive the neck therebetween with the head disposed below the rollers as the bird is advanced, the distance between the rows being insufficient to clear said head and progressively decreasing as one end of the rows is approached, the rollers of one row being offset in staggered relationship to the rollers of the other row and each roller having an outer, transversely arcuate edge of substantially narrower transverse width than the transverse dimension of respective rollers adjacent the axes thereof whereby circumferentially extending surfaces are presented on each roller for disjointing the head of the bird from its neck without breaking the skin of the same; and means floatingly mounting the rollers on said support for limited, vertical reciprocation along their axes of rotation toward and away from the support.

2. In poultry processing equipment for disjointing the head of a bird from its neck adjacent the base of the skull while the neck is stretched longitudinally taut and as the bird is advanced along a horizontal, rectilinear path of travel, suspended from a conveyor by its legs, the combination of: a support adapted to be positioned beneath the conveyor; two spaced, horizontal rows of spaced-apart rollers disposed with the space therebetween in alignment with the path of travel of said neck, said rows of rollers being adapted to receive the neck therebetween with the head disposed below the rollers as the bird is advanced, the distance between the rows being insufficient to clear said head and progressively decreasing as one end of the rows is approached, the rollers of one row being offset in staggered relationship to the rollers of the other row and each roller having a frusto-conical upper surface concentric with the axis of a respective roller and a relatively flat lower surface perpendicular to said axis, there being a circumferentially extending, transversely arcuate edge interconnecting and merging smoothly with the outer peripheral margins of corresponding surfaces and faces on said rollers whereby the rollers disjoint the head of the bird from its neck without breaking the skin of the same; and a vertical pin secured to the support for each roller respectively, said pins journalling the rollers for free, horizontal rotation, each pin having a roller-retaining head spaced from the support, said rollers being freely reciprocable vertically between the heads and the support along their axes of rotation about the pins.

3. In poultry processing equipment for disjointing the head of a bird from its neck adjacent the base of the skull while the neck is stretched longitudinally taut and as the bird is advanced along a horizontal, rectilinear path of travel, suspended from a conveyor by its legs, the combination of: a support adapted to be positioned beneath the conveyor; two spaced, horizontal rows of spaced-apart rollers disposed with the space therebetween in alignment with the path of travel of said neck, said rows of rollers being adapted to receive the neck therebetween with the head disposed below the rollers as the bird is advanced, the distance between the rows being insufficient to clear said head and progressively decreasing as one end of the rows is approached, the rollers of one row being offset in staggered relationship to the rollers of the other row and each roller having a frusto-conical upper surface concentric with the axis of a respective roller and a relatively flat lower surface perpendicular to said axis, there being a circumferentially extending, transversely arcuate edge interconnecting and merging smoothly with the outer peripheral margins of corresponding surfaces and faces on said rollers whereby the rollers disjoint the head of the bird from its neck without breaking the skin of the same; a vertical pin extending upwardly from the support for each roller respectively, said pins journalling the rollers for free, horizontal rotation, each pin having a roller-retaining head spaced from the support thereabove, said rollers being freely reciprocable vertically between the heads and the support along their axes of rotation about the pins; and a tubular bushing between each roller respectively and its pin, the bushings having integral, outturned flanges between the rollers and the support.

4. In poultry processing equipment for disjointing the head of a bird from its neck adjacent the base of the skull while the neck is stretched longitudinally taut and as the bird is advanced along a horizontal, rectilinear path of travel, suspended from a conveyor by its legs, the combination of: two spaced, horizontal rows of spaced, horizontally-rotatable rollers disposed with the space therebetween in alignment with the path of travel of said neck, said rows of rollers being adapted to receive the neck therebetween with the head disposed below the rollers as the bird is advanced, the distance between the rows being insufficient to clear said head and progressively decreasing as one end of the rows is approached, the rollers of one row being offset in staggered relationship to the rollers of the other row and each roller having a frusto-conical upper surface concentric with the axis of a respective roller and a relatively flat lower surface perpendicular to said axis, there being a circumferentially extending, transversely arcuate edge interconnecting and merging smoothly with the outer peripheral margins of corresponding surfaces and faces on said rollers whereby the rollers disjoint the head of the bird from its neck without breaking the skin of the same; an elongated, horizontal plate for each of said rows respectively therebeneath having spaced-apart, longitudinal edges, presenting a head-clearing slot; means floatingly mounting the rollers on said plates for limited, vertical reciprocation along their axes of rotation toward and away from the plates with the rollers overlapping the slot; and means mounting the plates for movement toward and away from each other to vary said distance between the rows.

5. In poultry processing equipment for disjointing the head of a bird from its neck adjacent the base of the skull while the neck is stretched longitudinally taut and as the bird is advanced along a horizontal, rectilinear path of travel, suspended from a conveyor by its legs, the combination of: a support adapted to be positioned beneath the conveyor; two spaced, horizontal rows of spaced, horizontally-rotatable rollers disposed with the space therebetween in alignment with the path of travel of said neck, said rows of rollers being adapted to receive the neck therebetween with the head disposed below the rollers as the bird is advanced, the distance between the rows being insufficient to clear said head and progressively decreasing as one end of the rows is approached, the rollers of one row being offset in staggered relationship to the rollers of the other row and each roller having a frusto-conical upper surface concentric with the axis of a respective roller and a relatively flat lower surface perpendicular to said axis, there being a circumferentially extending, transversely arcuate edge interconnecting and merging smoothly with the outer peripheral margins of corresponding surfaces and faces on said rollers whereby the rollers disjoint the head of the bird from its neck without breaking the skin of the same; an elongated, horizontal plate for each of said rows respectively therebeneath having spaced-apart, longitudinal edges, presenting a head-clearing slot; means mounting the rollers on the plates with the rollers overlapping the slot; means mounting the plates on the support for movement toward and away from each other to vary said distance between the rows; and means on the support at each end respectively of each plate for moving the plates toward and away from each other.

6. In poultry processing equipment for severing the head of a bird from its neck adjacent the base of the skull while the neck is stretched longitudinally taut and as the bird is advanced along a horizontal, rectilinear path of travel, suspended from a conveyor by its legs, the combination of: a support adapted to be positioned beneath the conveyor; two spaced, horizontal rows of spaced, horizontally-rotatable rollers mounted on said support and disposed with the space therebetween in alignment with the path of travel of said neck, said rows of rollers being adapted to receive the neck therebetween with the head disposed below the rollers as the bird is advanced, the distance between the rows being insufficient to clear said head and progressively decreasing as one end of the rows is approached, the rollers of one row being offset in staggered relationship to the rollers of the other row and each roller having an outer, transversely arcuate edge of substantially narrower transverse width than the transverse dimension of respective rollers adjacent the axes thereof whereby circumferentially extending surfaces are presented on each roller for disjointing the head of the bird from its neck without breaking the skin of the same said support having an elongated opening disposed in alignment with the space between said rows of rollers and adapted to receive the neck therewithin with said head sliding along the support below the latter as the bird is advanced, the width of said opening being insufficient to clear said head and terminating in an enlarged hole; a rotatable cutter disc adjacent the hole above the support and eccentric to the hole, presenting a neck-receiving passage between the peripheries of the disc and the hole, communicating with said opening and progressively increasing in width as the latter is approached; means on the support for deflecting said neck into said passage; and head retarding means carried by the support between said rollers and the cutter disc for maintaining the neck of the bird in a stretched, taut condition until the same is guided into the passage by said deflecting means.

7. In poultry processing equipment for severing the head of a bird from its neck adjacent the base of the skull while the neck is stretched longitudinally taut and as the bird is advanced along a horizontal, rectilinear path of travel, suspended from a conveyor by its legs, the combination of: a support adapted to be positioned beneath the conveyor; two spaced, horizontal rows of spaced, horizontally-rotatable rollers mounted on said support and disposed with the space therebetween in alignment with the path of travel of said neck, said rows of rollers being adapted to receive the neck therebetween with the head disposed below the rollers as the bird is advanced, the distance between the rows being insufficient to clear said head and progressively decreasing as one end of the rows is approached, the rollers of one row being offset in staggered relationship to the rollers of the other row and each roller having an outer, transversely arcuate edge of substantially narrower transverse width than the transverse dimension of respective rollers adjacent the axes thereof whereby circumferentially extending surfaces are presented on each roller for disjointing the head of the bird from its neck without breaking the skin of the same said support having an elongated opening disposed in alignment with the space between said rows of rollers and adapted to receive the neck therewithin with said head sliding along the support below the latter as the bird is advanced, the width of said opening being insufficient to clear said head and terminating in an enlarged hole; a rotatable cutter disc adjacent the hole above the support and eccentric to the hole, presenting a neck-receiving passage between the peripheries of the disc and the hole, communicating with said opening and progressively increasing in width as the latter is approached; a rod on the support for deflecting said neck into said passage, said rod having a pair of angularly displaced stretches provided with a zone of merger disposed directly above the point of communication between the hole and the opening; and flexible head retarding means carried by the support between said rollers and the cutter disc and normally extending across said opening for maintaining the neck of the bird in a stretched, taut condition until the same is guided into the passage by said rod.

8. In poultry processing equipment for severing the head of a bird from its neck adjacent the base of the skull while the neck is stretched longitudinally taut and as the bird is advanced along a horizontal, rectilinear path of travel, suspended from a conveyor by its legs, the combination of: a support adapted to be position beneath the conveyor; two spaced, horizontal rows of spaced, horizontally-rotatable rollers mounted on said support and disposed with the space therebetween in alignment with the path of travel of said neck, said rows of rollers being adapted to receive the neck therebetween with the head disposed below the rollers as the bird is advanced, the distance between the rows being insufficient to clear said head and progressively decreasing as one end of the rows is approached, the rollers of one row being offset in staggered relationship to the rollers of the other row and each roller having an outer, transversely arcuate edge of substantially narrower transverse width than the transverse dimension of respective rollers adjacent the axes thereof whereby circumferentially extending surfaces are presented on each roller for disjointing the head of the bird from its neck without breaking the skin of the same said support having an elongated opening disposed in alignment with the space between said rows of rollers and adapted to receive the neck therewithin with said head sliding along the support below the latter as the bird is advanced, the width of said opening being insufficient to clear said head and terminating in an enlarged hole; a rotatable cutter disc adjacent the hole above the support and eccentric to the hole, presenting a neck-receiving passage between the peripheries of the disc and the hole, communicating with said opening and progressively increasing in width as the latter is approached; a rod on the support for deflecting said neck into said passage, said rod having a pair of angularly displaced stretches provided with a zone of merger disposed directly above the point of communication between the hole and the opening, one of the stretches extending from said zone of merger, tangentially to the disc thereabove and in substantially the same direction as the said passage; and a pair of elongated, spaced, flexible retarders secured to the support between the rollers and said disc and disposed angularly across said opening with the longitudinal lengths thereof extending in the direction of movement of the bird for maintaining the neck of the same in a stretched, taut condition until the neck is guided into the passage by said rod.

References Cited in the file of this patent

UNITED STATES PATENTS

| | | |
|---|---|---|
| 2,694,220 | Sharp | Nov. 16, 1954 |
| 2,756,545 | Atkeson | July 31, 1956 |
| 2,828,506 | O'Donnell | Apr. 1, 1958 |